US008465659B2

(12) United States Patent
Dolan et al.

(10) Patent No.: US 8,465,659 B2
(45) Date of Patent: Jun. 18, 2013

(54) POLYMER LAYER REMOVAL ON PZT ARRAYS USING A PLASMA ETCH

(75) Inventors: Bryan R. Dolan, Rochester, NY (US); John R. Andrews, Fairport, NY (US); Bradley J. Gerner, Penfield, NY (US); Mark A. Cellura, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 260 days.

(21) Appl. No.: 13/011,409

(22) Filed: Jan. 21, 2011

(65) Prior Publication Data

US 2012/0187076 A1 Jul. 26, 2012

(51) Int. Cl.
*G01D 15/00* (2006.01)

(52) U.S. Cl.
USPC .................. 216/27; 216/67; 347/68; 347/70; 347/71; 347/72; 428/411.11

(58) Field of Classification Search
USPC ........... 347/68, 70–72; 216/27, 67; 428/411.1
See application file for complete search history.

(56) References Cited

U.S. PATENT DOCUMENTS 6,530,653 B2 * 3/2003 Le et al. .......................... 347/71
8,303,093 B2 * 11/2012 Dolan et al. .................... 347/71
2002/0149652 A1 * 10/2002 Sakamoto et al. .............. 347/68
2007/0153065 A1 7/2007 Brick et al.
2008/0239022 A1 10/2008 Andrews et al.
2008/0299396 A1 12/2008 Lin et al.
2010/0141703 A1 6/2010 Andrews et al.
2011/0141205 A1 6/2011 Gerner et al.

FOREIGN PATENT DOCUMENTS

EP 452663 * 10/1991

OTHER PUBLICATIONS

Nayve Regan et al. Jounral of Microelectromechanical Systems, vol. 13, No. 13, Oct. 2004, pp. 814-821.*
U.S. Appl. No. 12/638,582, filed Dec. 15, 2009, by Gerner et al.

* cited by examiner

*Primary Examiner* — Nadine Norton
*Assistant Examiner* — Maki Angadi
(74) *Attorney, Agent, or Firm* — MH2 Technology Law Group LLP

(57) ABSTRACT

A method for forming an ink jet print head can include attaching a plurality of piezoelectric elements to a diaphragm, dispensing a dielectric fill layer over the diaphragm and the plurality of piezoelectric elements to encapsulate the piezoelectric elements, curing the dielectric fill layer to form an interstitial layer, then removing the interstitial layer from an upper surface of the plurality of piezoelectric elements using a plasma etch.

19 Claims, 10 Drawing Sheets

POLYMER LAYER REMOVAL ON PZT ARRAYS USING A PLASMA ETCH

FIELD OF THE INVENTION

The present teachings relate to the field of ink jet printing devices and, more particularly, to high a density piezoelectric ink jet print head and methods of making a high density piezoelectric ink jet print head.

BACKGROUND OF THE INVENTION prop on demand ink jet technology is widely used in the printing industry. Printers using drop on demand ink jet technology can use either thermal ink jet technology or piezoelectric technology. Even though they are more expensive to manufacture than thermal ink jets, piezoelectric ink jets are generally favored as they can use a wider variety of inks and eliminate problems with kogation.

Piezoelectric ink jet print heads typically include a flexible diaphragm and a piezoelectric element attached to the diaphragm. When a voltage is applied to the piezoelectric element, typically through electrical connection with an electrode electrically coupled to a voltage source, the piezoelectric element vibrates, causing the diaphragm to flex which expels a quantity of ink from a chamber through a nozzle. The flexing further draws ink into the chamber from a main ink reservoir through an opening to replace the expelled ink.

Increasing the printing resolution of an ink jet printer employing piezoelectric ink jet technology is a goal of design engineers. Increasing the jet density of the piezoelectric ink jet print head can increase printing resolution. One way to increase the jet density is to eliminate manifolds which are internal to a jet stack. With this design, it is preferable to have a single port through the back of the jet stack for each jet. The port functions as a pathway for the transfer of ink from the reservoir to each jet chamber. Because of the large number of jets in a high density print head, the large number of ports, one for each jet, must pass vertically through the diaphragm and between the piezoelectric elements.

Manufacturing a high density ink jet print head assembly having an external manifold has required new processing methods. Methods for manufacturing a print head having electrical contacts with reduced resistance, and the resulting print head, would be desirable.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

An embodiment of the present teachings can include a method for forming an ink jet print head. The method can include attaching a diaphragm attach material to a diaphragm, wherein the diaphragm can include a plurality of openings, attaching a plurality of piezoelectric elements to the diaphragm, and dispensing a dielectric fill material to encapsulate the plurality of piezoelectric elements and to contact the diaphragm, wherein the diaphragm attach material prevents the flow of dielectric fill material through the plurality of openings in the diaphragm. The dielectric fill material can be cured to form an interstitial layer between the plurality of piezoelectric elements and over an upper surface of the plurality of piezoelectric elements. The interstitial layer can be removed from the upper surface of the plurality of piezoelectric elements using a plasma etch.

Another embodiment for forming an ink jet print head can include attaching a diaphragm attach material to a diaphragm, wherein the diaphragm can include a plurality of openings therethrough, attaching a plurality of piezoelectric elements to the diaphragm, dispensing a dielectric fill material to encapsulate the plurality of piezoelectric elements and to contact the diaphragm, wherein the diaphragm attach material prevents the flow of dielectric fill material through the plurality of openings in the diaphragm, and curing the dielectric fill material to form an interstitial layer between the plurality of piezoelectric elements and over an upper surface of the plurality of piezoelectric elements. The method can further include placing a patterned adhesive layer and a patterned removable liner over the interstitial layer, wherein openings within the patterned adhesive layer and the patterned removable liner expose the interstitial layer at locations which overlie the piezoelectric elements, and removing the interstitial layer from the upper surface of the plurality of piezoelectric elements with a plasma etch using the patterned removable liner and the patterned adhesive layer as an etch mask.

Another embodiment for forming an ink jet print head can include attaching a piezoelectric element layer to a transfer carrier, dicing the piezoelectric element layer to form a plurality of piezoelectric elements, and attaching the plurality of piezoelectric elements to a diaphragm of a jet stack subassembly, wherein the jet stack subassembly can further include an inlet/outlet plate, a body plate, a plurality of openings in the diaphragm, and a diaphragm attach material which covers the plurality of openings in the diaphragm. The method can further include dispensing a dielectric fill material to encapsulate the plurality of piezoelectric elements and to contact the diaphragm, wherein the diaphragm attach material prevents the flow of dielectric fill material through the plurality of openings in the diaphragm, curing the dielectric fill material to form an interstitial layer between the plurality of piezoelectric elements and over an upper surface of the plurality of piezoelectric elements, placing a patterned adhesive layer and a patterned removable liner over the interstitial layer, wherein openings within the patterned adhesive layer and the patterned removable liner expose the interstitial layer at locations which overlie the piezoelectric elements, and removing the interstitial layer from the upper surface of the plurality of piezoelectric elements with a plasma etch using the patterned removable liner and the patterned adhesive layer as an etch mask, wherein the plasma etch can include introducing an oxygen gas into an etch chamber at a delivery rate sufficient to provide an equilibrium chamber pressure of between about 25 mTorr to about 500 mTorr, for example between about 100 mTorr and about 200 mTorr, and igniting a plasma at a radiofrequency power of between about 0 W and about 1000 W, and more particularly between about 800 W and about 1,000 W, for example about 900 W. The chamber parameters can be set based, for example, on the interstitial material, for example the epoxy formulation. Depending on the formulation of the interstitial material, other process gasses can be used by themselves or in combination in addition to oxygen, for example argon, hydrogen, carbon tetrafluoride, and sulfur hexafluoride. The method can further include placing a conductive paste within the openings in the patterned removable liner and the patterned adhesive layer, removing the patterned removable liner. Additionally, using a laser beam, ablating the diaphragm attach material, the interstitial layer, and the patterned adhesive layer from the plurality of openings in the diaphragm, wherein the body plate and the inlet/outlet plate mask the laser beam, mechanically attaching a printed circuit board (PCB) to the interstitial layer with the patterned adhesive layer, wherein the conductive paste electrically coupled PCB electrodes to the piezoelectric elements, and attaching a manifold to the PCB.

A method for forming an assembly can include encapsulating a piezoelectric structure within an epoxy and plasma etching at least a portion of the epoxy to expose the piezoelectric structure.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the inventive embodiments rather than to maintain strict structural accuracy, detail, and scale.

DESCRIPTION OF THE EMBODIMENTS

Reference will now be made in detail to embodiments of the present teachings, an example of which is illustrated in the accompanying drawings. Wherever possible, the same reference numbers will be used throughout the drawings to refer to the same or like parts.

As used herein, the word "printer" encompasses any apparatus that performs a print outputting function for any purpose, such as a digital copier, bookmaking machine, facsimile machine, a multi-function machine, etc. The word "polymer" encompasses any one of a broad range of carbon-based compounds formed from long-chain molecules including thermoset polyimides, thermoplastics, resins, polycarbonates, epoxies, and related compounds known to the art.

Figure 1:
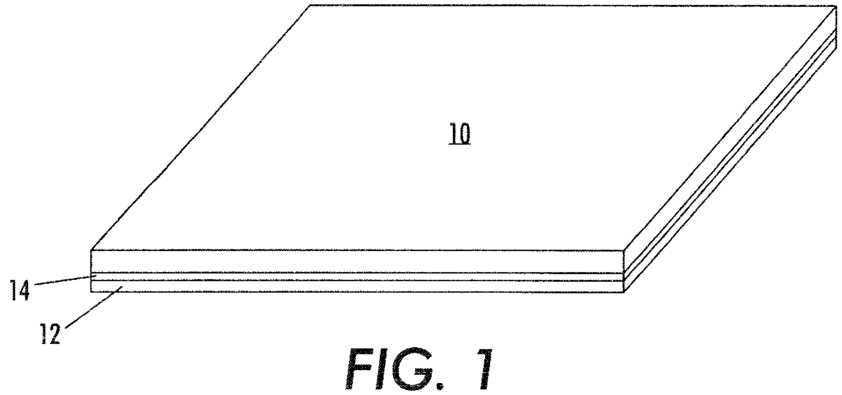
FIGS. 1 and 2 are perspective views of intermediate piezoelectric elements of an in-process device in accordance with an embodiment of the present teachings.

In the perspective view of FIG. 1, a piezoelectric element layer 10 is detachably bonded to a transfer carrier 12 with an adhesive 14. The piezoelectric element layer 10 can include, for example, a lead-zirconate-titanate layer, for example between about 25 μm to about 150 μm thick to function as an inner dielectric. The piezoelectric element layer 10 can be plated on both sides with nickel, for example, using an electroless plating process to provide conductive elements on each side of the dielectric PZT. The nickel-plated PZT functions essentially as a parallel plate capacitor which develops a difference in voltage potential across the inner PZT material. The carrier 12 can include a metal sheet, a plastic sheet, or another transfer carrier. The adhesive layer 14 which attaches the piezoelectric element layer 10 to the transfer carrier 12 can include a dicing tape, thermoplastic, or another adhesive. In another embodiment, the transfer carrier 12 can be a material such as a self-adhesive thermoplastic layer such that a separate adhesive layer 14 is not required.

Figure 2:
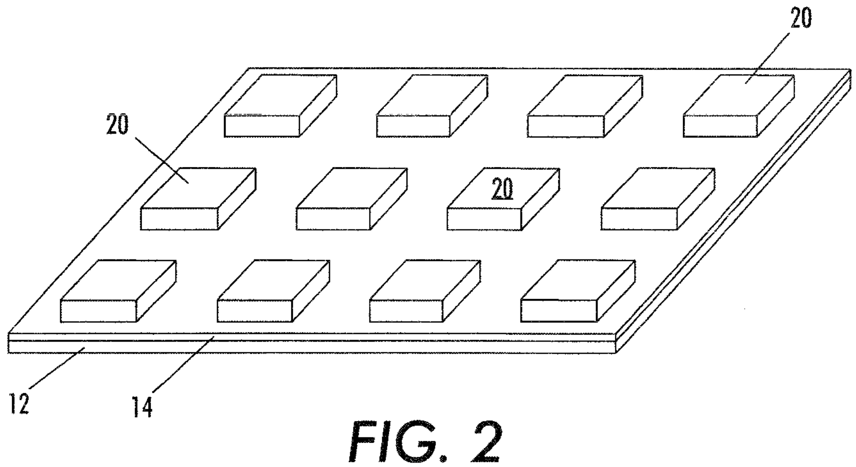

After forming the FIG. 1 structure, the piezoelectric element layer 10 is diced to form a plurality of individual piezoelectric elements 20 as depicted in FIG. 2. It will be appreciated that while FIG. 2 depicts 4×3 array of piezoelectric elements, a larger array can be formed. For example, current print heads can have a 344×20 array of piezoelectric elements. The dicing can be performed using mechanical techniques such as with a saw such as a wafer dicing saw, using a dry etching process, using a laser ablation process, etc. To ensure complete separation of each adjacent piezoelectric element 20, the dicing process can terminate after removing a portion of the adhesive 14 and stopping on the transfer carrier 12, or after dicing through the adhesive 14 and into the carrier 12.

Figure 3:
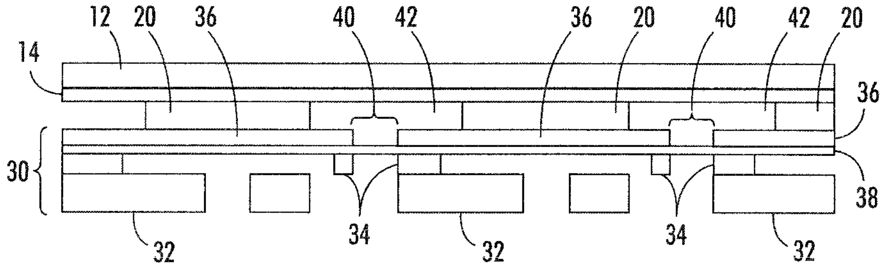
FIGS. 3-14 are cross sections depicting the formation of an ink jet print head including a jet stack of an in-process device.

After forming the individual piezoelectric elements 20, the FIG. 2 assembly can be attached to a jet stack subassembly 30 as depicted in the cross section of FIG. 3. The FIG. 3 cross section is magnified from the FIG. 2 structure for improved detail, and depicts cross sections of one partial and two complete piezoelectric elements 20. The jet stack subassembly 30 can be manufactured using known techniques. The jet stack subassembly 30 can include, for example, an inlet/outlet plate 32, a body plate 34, and a diaphragm 36 which is attached to the body plate 34 using an adhesive diaphragm attach material 38. The diaphragm 36 can include a plurality of openings 40 for the passage of ink in the completed device as described below. The FIG. 3 structure further includes a plurality voids 42 which, at this point in the process, can be filed with ambient air. The diaphragm attach material 38 can be a solid sheet of material such as a single sheet polymer so that the openings 40 through the diaphragm 36 are covered.

In an embodiment, the FIG. 2 structure can be attached to the jet stack subassembly 30 using an adhesive between the diaphragm 36 and the piezoelectric elements 20. For example, a measured quantity of adhesive (not individually depicted) can be dispensed, screen printed, rolled, etc. onto either the upper surface of the piezoelectric elements 20, onto the diaphragm 36, or both. In an embodiment, a single drop of adhesive can be placed onto the diaphragm for each individual piezoelectric element 20. After applying the adhesive, the jet stack subassembly 30 and the piezoelectric elements 20 are aligned with each other, then the piezoelectric elements 20 are mechanically connected to the diaphragm 36 with the adhesive. The adhesive is cured by techniques appropriate for the adhesive to result in the FIG. 3 structure.

Subsequently, the transfer carrier 12 and the adhesive 14 are removed from the FIG. 3 structure to result in the structure of FIG. 4.

Figure 4:
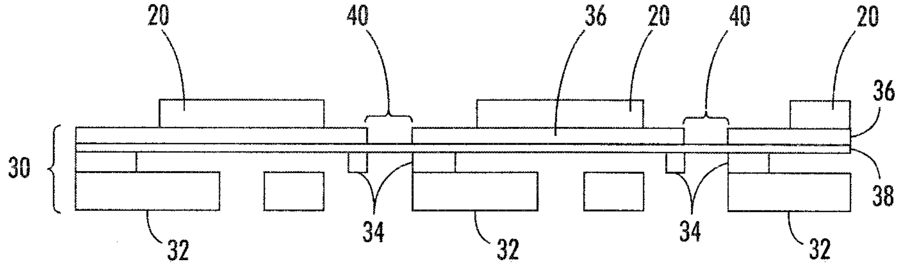
Figure 5:
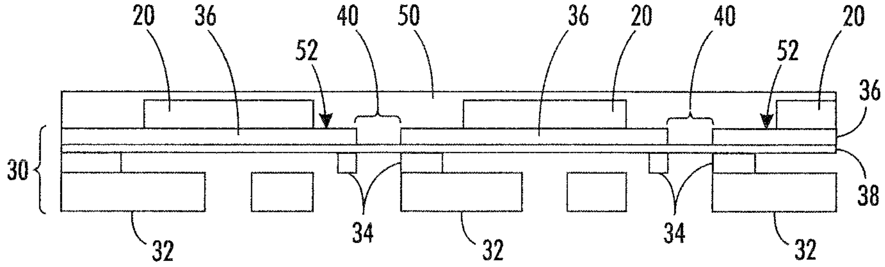

Next, dielectric fill material is dispensed over the FIG. 4 structure, then cured to provide an interstitial layer 50. The dielectric fill material can be a polymer, for example a combination of Epon™ 828 epoxy resin (100 parts by weight) available from Miller-Stephenson Chemical Co. of Danbury, Conn. and Epikure™ 3277 curing agent (49 parts by weight) available from Hexion Specialty Chemicals of Columbus, Ohio. The dielectric fill material can be dispensed in a quantity sufficient to cover exposed portions of an upper surface 52 of the diaphragm 36 and to encapsulate the piezoelectric elements 20 subsequent to curing as depicted in FIG. 5. The dielectric fill material can further fill the openings 40 within the diaphragm 36 as depicted. The diaphragm attach material 38 which covers openings 40 in the diaphragm 36 prevents the dielectric fill material from passing through the openings 40.

The interstitial layer 50 can be planarized either before or after curing the dielectric fill material. Planarization can be performed, for example, by material self-leveling or techniques including mechanical wiping and molding under pressure.

Figure 6:
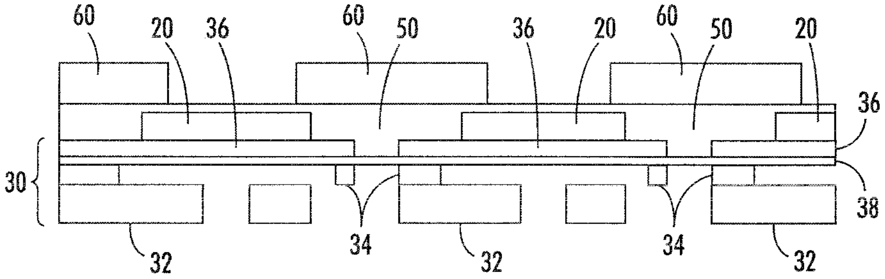

Next, the interstitial layer 50 is removed from the upper surface of the piezoelectric elements 20. In an embodiment, a patterned mask 60 such as a patterned photoresist mask can be formed with openings 62 using known photolithographic techniques as depicted in FIG. 6. The openings 62 expose a portion of the interstitial layer 50 which covers each piezoelectric element 20, and further expose a portion of each piezoelectric element 20 as depicted.

In another embodiment, the patterned mask 60 can be a layer of thermoplastic polyimide. For example, the patterned mask 60 can be a layer of DuPont® 100ELJ, which is patterned using laser ablation, a punch process, etching, etc. DuPont 100ELJ is typically manufactured and provided in a thickness of 25 μm (0.001 inch), although other thicknesses would be suitable if available, for example between about 20 μm to about 40 μm. In an embodiment, a thermoplastic polyimide mask can be attached to the surface of the polymer interstitial layer 50 using a heat lamination press. In an embodiment, the attachment can occur at a temperature of between about 180° C. and about 200° C., for example about 190° C. In an embodiment, the attachment can occur at a pressure of between about 90 psi and about 110 psi, for example at about 100 psi. The attachment process can be performed for a duration of between about 5 minutes and about 15 minutes, for example about 10 minutes.

In an embodiment, the mask can be of a material which can release from the interstitial layer 50 subsequent to removal of the exposed interstitial layer 50 with sufficient ease so as not to lift or otherwise damage the interstitial layer 50, the piezoelectric elements 20, or other structures. Temperatures during an etch such as plasma etch can reach 150° C. which, without intending to be bound by theory, can cure, harden, densify, and/or outgas the mask material and make it more difficult to remove from the interstitial layer 50.

The openings 62 of the mask can be positioned to expose only the polymer and the upper surface of each piezoelectric element 20 to which an electrical connection will be made subsequently, for example with silver epoxy in contact with a printed circuit board (PCB) electrode. The openings 62 should be of a sufficient size so that electrical resistance between the piezoelectric elements 20 and a subsequently formed electrode is within allowable limits which provides for a functional device with acceptable reliability. The openings themselves can be round, oval, square, rectangular, etc.

Subsequently, an etch such as a plasma etch is performed on the FIG. 6 structure to remove the exposed interstitial layer 50. In an embodiment, a plasma etch can be performed under conditions sufficient to reduce processing time. For example, an active ion trap plasma mode can be used in combination with an oxygen process gas. For example, an oxygen gas can be introduced into a plasma etch chamber at a delivery rate sufficient to provide an equilibrium chamber pressure of between about 100 mTorr and about 200 mTorr, for example about 150 mTorr. Plasma can be ignited at a radiofrequency (RF) power of between about 800 W and 1,000 W, for example about 900 W. In the active ion etch plasma mode, the assembly of FIG. 6 can be placed between two adjacent active electrodes. The two adjacent active electrodes can be placed between two grounded electrodes. Depending on the interstitial material, etch time can range from about one second to about one hour, for example between about 5 minutes and 15 minutes, and more particularly between about 5 minutes and 10 minutes. Using a 25 μm thick layer of DuPont 100ELJ, processing time can be between about 1 second and about 15 minutes, for example between about 1 second and about 10 minutes. Plasma modes other than an active ion trap mode can be used depending on the interstitial material, including modes such as a reactive ion etch, electron-free etch, an active etch, an electron-free ion trap, with the mode depending on the configuration of shelves (i.e. active, grounded, and floating) in the plasma chamber.

The plasma etch can effectively remove the interstitial layer 50 from the surface of the nickel-plated PZT piezoelectric elements 20. It has been found that the surface of a nickel-plated PZT piezoelectric element 20 has a high surface roughness which makes removal of the interstitial layer 50 from the relatively deep and narrow (i.e. high aspect ratio) grooves difficult. Dielectric material remaining in the grooves in the nickel plating can increase electrical resistance between the piezoelectric element 20 and a PCB electrode which is subsequently electrically coupled with the piezoelectric element 20. Efficient removal of interstitial material 50 from the etched surface of the piezoelectric elements 20 will decrease resistance and improve the electrical characteristics of the device. The use of a masked plasma etch as described herein removes the dielectric material from these grooves more effectively than conventional removal methods. An etch rate of interstitial material 50 from the relatively narrow grooves within the piezoelectric element 20 is less than an etch rate of interstitial material 50 between adjacent relatively widely spaced piezoelectric elements 20. An unmasked plasma etch may result in excessive loss of interstitial material 50 between adjacent piezoelectric elements 20, thus a masked plasma etch exposing the interstitial material 50 at locations overlying the piezoelectric elements 20 and protecting interstitial material 50 at locations between piezoelectric elements 20 can be used to prevent this loss.

Figure 7:
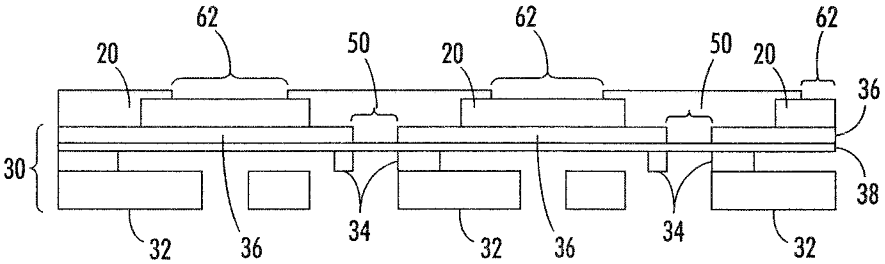

After etching the interstitial layer 50, the patterned mask 60 is removed to result in the structure of FIG. 7. If patterned mask 60 is a patterned photoresist mask, the patterned mask 60 can be removed using standard techniques. If the patterned mask 60 is a thermoplastic polymer such as DuPont 100ELJ, the patterned mask can be removed by peeling, for example.

Figure 8:
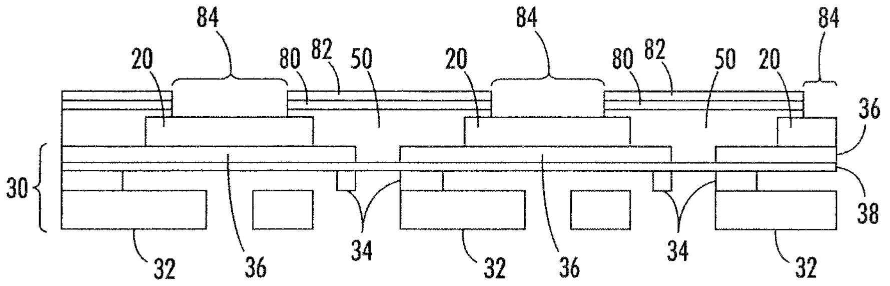

Next, an assembly including a patterned adhesive layer 80 and a patterned removable liner 82 is aligned and attached to the FIG. 7 structure as depicted in FIG. 8. The adhesive 80 can be, for example, a thermoset or thermoplastic sheet. The removable liner 82 can be a polyimide material, or another material which can be removed from the adhesive 80. The assembly including adhesive layer 80 and removable liner 82 includes a pattern of preformed openings 84 therein which expose the piezoelectric elements 20. The openings 84 within the adhesive 80 and liner 82 can be formed prior to attachment, for example using laser ablation, a punch process, etching, etc. The size of the openings 84 can be targeted to match the size of openings 62 in the interstitial layer 50 as depicted, although they can be slightly larger or smaller as long as the size mismatch does not adversely affect subsequent processing. The combined thickness of the adhesive 80 and the removable liner 82 will, in part, determine a quantity of conductor which remains on the piezoelectric elements 20 after subsequent processing. A combined thickness of the adhesive 80 and removable liner 82 can be between about 15 μm and about 100 μm, or another suitable thickness.

Figure 9:
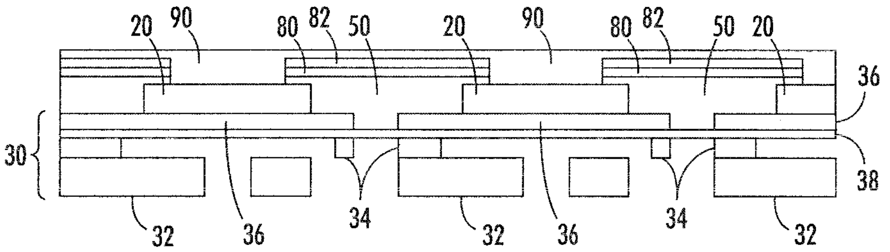

Next, as depicted in FIG. 9, a conductor 90 such as a conductive paste is applied to the FIG. 8 assembly, for example with a screen printing process using the removable liner 82 as a stencil. Alternately, the adhesive can be dispensed onto the assembly.

Figure 10:
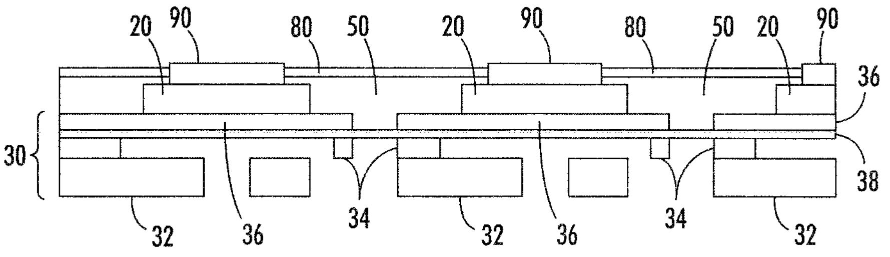

Subsequently, the removable liner 82 is removed from the FIG. 9 structure, for example by peeling, such that a structure similar to that depicted in FIG. 10 remains.

Figure 11:
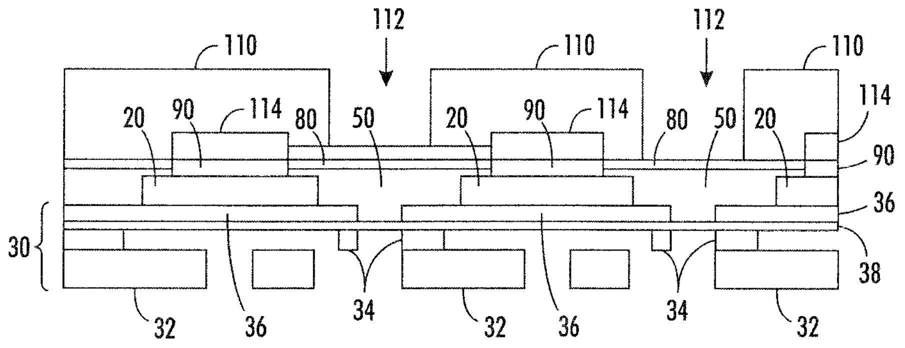

Next, a PCB 110 having a plurality of vias 112 and a plurality of PCB electrodes 114 is attached to the Fr. 10 assembly using the adhesive 80 to result in the structure of FIG. 11. The conductor 90 electrically couples the piezoelectric elements 20 to the PCB electrodes 114 such that a conductive path extends from the PCB electrodes 114 through the conductor 90 to the piezoelectric elements 20.

Figure 12:
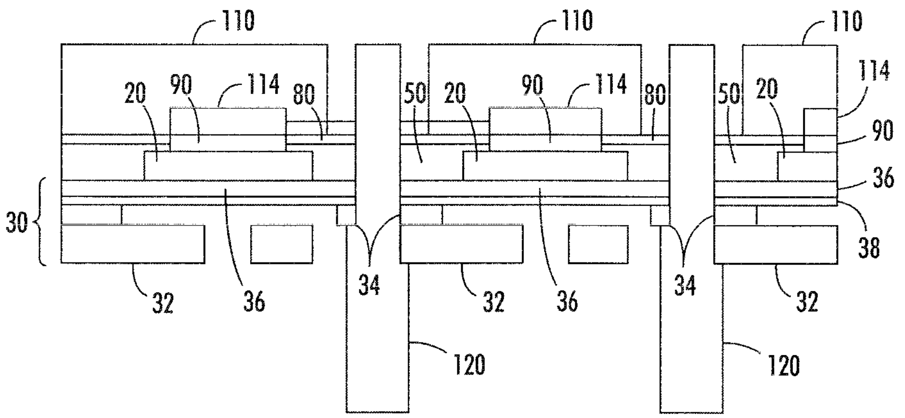
Figure 13:
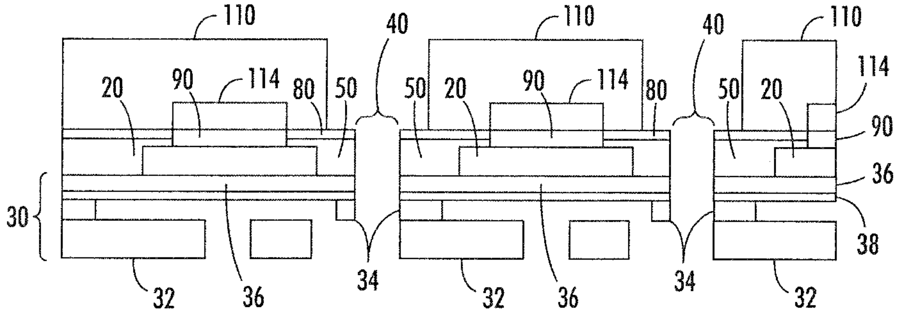

Next, the openings 40 through the diaphragm 36 can be cleared to allow passage of ink through the diaphragm. Clearing the openings includes removing a portion of the adhesive 80, the interstitial layer 50, and the diaphragm attach material 38 which covers the opening 40. In various embodiments, chemical or mechanical removal techniques can be used. In an embodiment, a self-aligned removal process can include the use of a laser beam 120 as depicted in FIG. 12, particularly where the inlet/outlet plate 32, the body plate 34, and the diaphragm 36 are formed from metal. The inlet/outlet plate 32, the body plate 34 and optionally, depending on the design, the diaphragm 36 can mask the laser beam for a self-aligned laser ablation process. In this embodiment, a laser such as a $CO_2$ laser, an excimer laser, a solid state laser, a copper vapor laser, and a fiber laser can be used. A $CO_2$ laser and an excimer laser can typically ablate polymers including epoxies. A $CO_2$ laser can have a low operating cost and a high manufacturing throughput. While two laser beams 120 are depicted in FIG. 12, a single laser beam can open each hole in sequence using one or more laser pulses. In another embodiment, two or more openings can be made in a single operation. For example, a mask can be applied to the surface then a single wide single laser beam could open two or more openings, or all of the openings, using one or more pulses from a single wide laser beam. A $CO_2$ laser beam that can over-fill the mask provided by the inlet/outlet plate 32, the body plate 34, and possibly the diaphragm 36 could sequentially illuminate each opening 40 to form the extended openings through the diaphragm attach material 38, the interstitial layer 50, and the adhesive 80 to result in the FIG. 13 structure.

Figure 14:
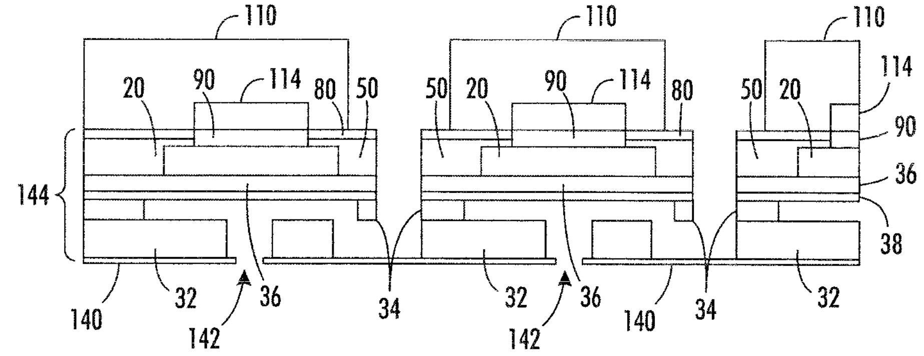

Subsequently, an aperture plate 140 can be attached to the inlet/outlet plate 32 with an adhesive (not individually depicted) as depicted in FIG. 14. The aperture plate 140 includes nozzles 142 through which ink is expelled during printing. Once the aperture plate 142 is attached, the jet stack 144 is complete.

Figure 15:
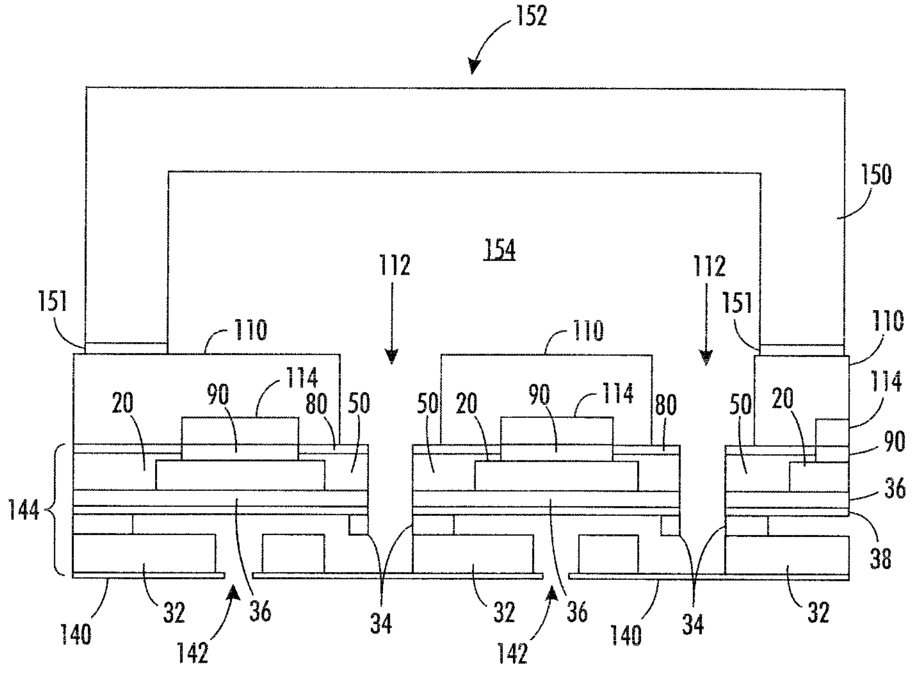
FIG. 15 is a cross section of a print head including a jet stack.

Subsequently, a manifold 150 is bonded to the PCB 110, for example using a fluid-tight sealed connection 151 such as an adhesive to result in an ink jet print head 152 as depicted in FIG. 15. The ink jet print head 152 can include a reservoir 154 within the manifold 150 for storing a volume of ink. Ink from the reservoir 154 is delivered through the vias 112 in the PCB 110 to ports 156 within the jet stack 144. It will be understood that FIG. 15 is a simplified view, and may have additional structures to the left and right of the FIG. For example, while FIG. 15 depicts two ports 156, a typical jet stack can have, for example, a 344×20 array of ports.

In use, the reservoir 154 in the manifold 150 of the print head 152 includes a volume of ink. An initial priming of the print head can be employed to cause ink to flow from the reservoir 154, through the vias 112 in the PCB 110, through the ports 156 in the jet stack 144, and into chambers 158 in the jet stack 144. Responsive to a voltage 160 placed on each electrode 122, each PZT piezoelectric element 20 vibrates at an appropriate time in response to a digital signal. The vibration of the piezoelectric element 20 causes the diaphragm 36 to flex which creates a pressure pulse within the chamber 158 causing a drop of ink to be expelled from the nozzle 142.

The methods and structure described above thereby form a jet stack 144 for an ink jet printer. In an embodiment, the jet stack 144 can be used as part of an ink jet print head 152 as depicted in FIG. 15.

Figure 16:
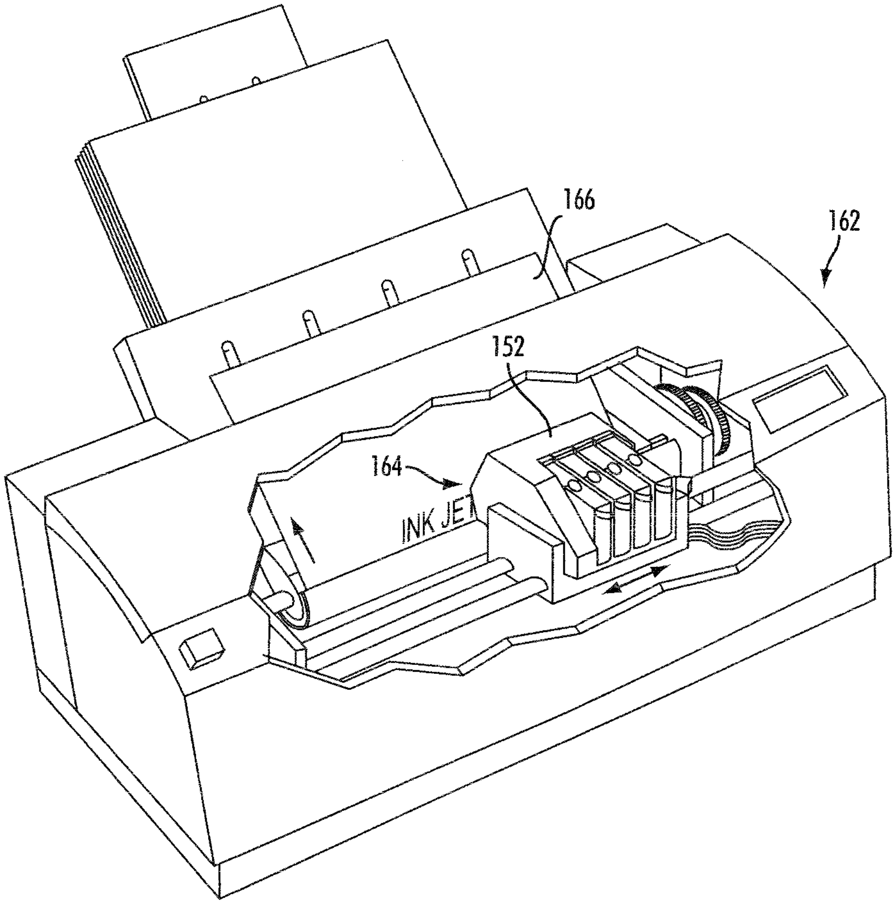
FIG. 16 is a printing device including a print head according to an embodiment of the present teachings.

FIG. 16 depicts a printer 162 including one or more print heads 154 and ink 164 being ejected from one or more nozzles 142 in accordance with an embodiment of the present teachings. The print head 154 is operated in accordance with digital instructions to create a desired image on a print medium 166 such as a paper sheet, plastic, etc. The print head 152 may move back and forth relative to the print medium 166 in a scanning motion to generate the printed image swath by swath. Alternately, the print head 154 may be held fixed and the print medium 166 moved relative to it, creating an image as wide as the print head 154 in a single pass. The print head 154 can be narrower than, or as wide as, the print medium 166.

Figure 17:
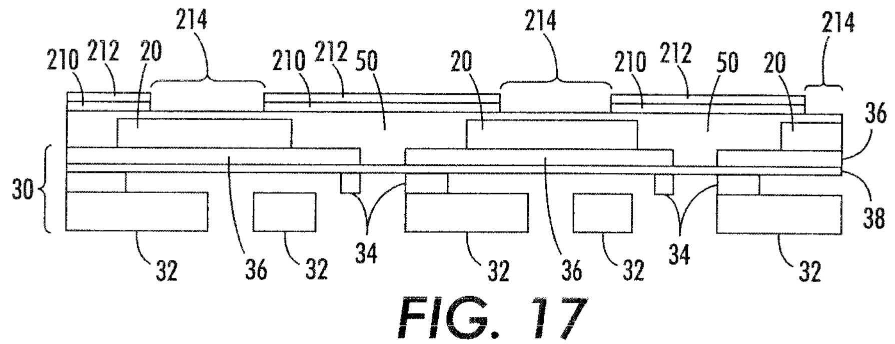
FIGS. 17-20 are cross sections of in-process structures depicting the formation of an ink jet print head including a jet stack according to another embodiment of the present teachings.

Another embodiment of the present teachings can begin with the FIG. 5 structure, including an interstitial layer 50 over the piezoelectric elements 20 as depicted in FIG. 17. Next, an assembly including a patterned adhesive layer 710 and a patterned removable liner 212 is aligned and attached to the FIG. 5 structure as depicted in FIG. 17. The patterned adhesive layer 210 can be, for example, a thermoset or thermoplastic sheet. The removable liner 212 can be a polyimide material, or another material which can be removed from the patterned adhesive layer 210. The assembly including adhesive layer 210 and removable liner 212 includes a pattern of preformed openings 214 therein which expose the interstitial layer 50 which at locations which overlie the piezoelectric elements 20 as depicted in FIG. 17. The openings 214 within the adhesive layer 210 and liner 212 can be formed prior to attachment, for example using laser ablation, a punch process, etching, etc. The combined thickness of the adhesive layer 210 and the removable liner 212 will, in part, determine a quantity of conductor which remains on the piezoelectric elements 20 after subsequent processing. A combined thickness of the adhesive 210 and removable liner 212 can be between about 15 μm and about 100 μm, or another suitable thickness.

Figure 18:
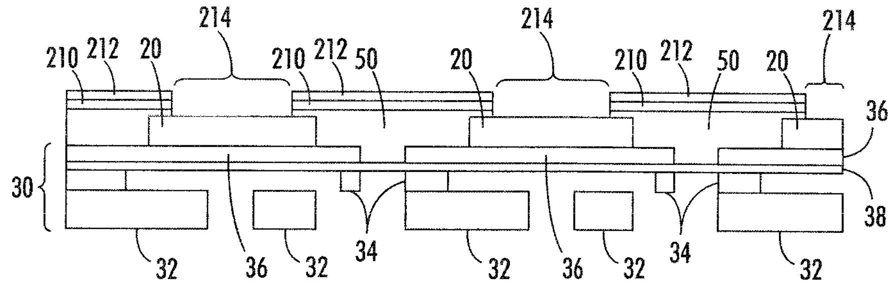

Subsequently, the exposed portion of the interstitial layer 50 which overlies the top surface of the piezoelectric elements 20 is etched using the removable liner 212 and the adhesive 210 as an etch mask to expose the piezoelectric electrodes 20 and result in the structure of FIG. 18. A plasma etch, such as the plasma etch described above, can be used to etch interstitial layer 50. Using the plasma etch to remove the interstitial layer 50 from over the piezoelectric elements 20 ensures that the interstitial layer 50 is removed from any grooves within the piezoelectric elements 20. Any interstitial material 50 remaining within grooves in the piezoelectric element 20 will increase resistance between the piezoelectric element 20 and a PCB electrode which is subsequently attached to the piezoelectric elements 20.

Figure 19:
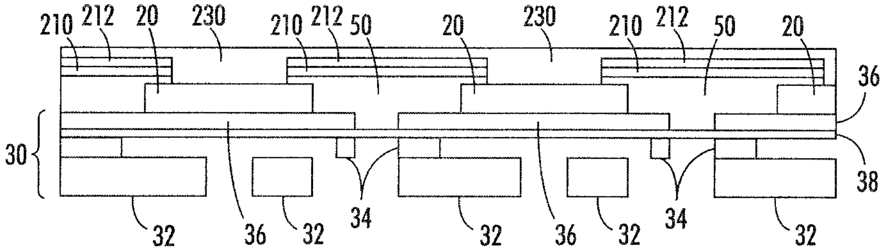

Next, a conductor 230 is placed on the piezoelectric elements 20, and may be placed over the removable liner 212 to ensure complete fill of the opening 214. The conductor can be a metal-filled epoxy, which can be applied by screen printing over the surface of the FIG. 18 structure to result in the structure of FIG. 19. The screen print process uses the removable liner 212 and the adhesive 210 as a mask.

Figure 20:
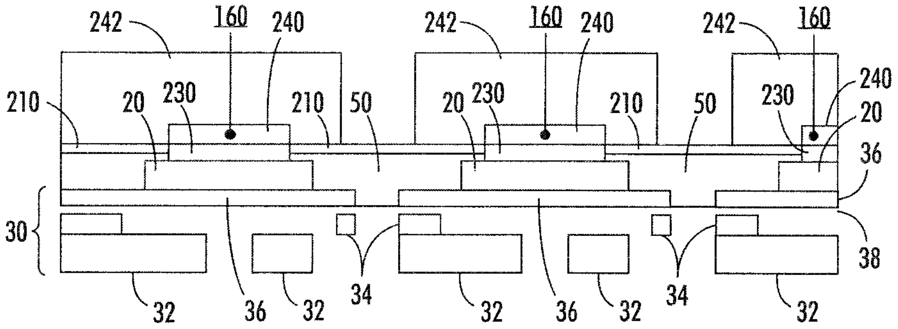

Subsequently, the removable liner 212 is removed, for example by peeling, which may remove excess conductor 230. The piezoelectric elements 20 can be electrically coupled to electrodes 240 which can be part of a PCB 242 using the conductor 230 as depicted in FIG. 20, while the PCB 242 can be mechanically attached to the interstitial layer 50 of the jet stack subassembly 30 with the adhesive layer 210. The conductor 230 is cured if necessary using a method appropriate for the conductor to result in the FIG. 20 structure. The conductor 230 electrically couples the piezoelectric elements 20 to the electrodes 240 such that a conductive path extends from the electrodes 240 through the conductor 230 to the piezoelectric elements 20.

Subsequently, the diaphragm attach material 38, the interstitial material 50, and adhesive 210 can be cleared, for example using a laser beam according to embodiments described above, then the PCB electrodes 230 can be electrically coupled with a voltage 160. A voltage placed on electrodes 240 causes the piezoelectric elements 20 to vibrate, such that the device can operate in a manner similar to that described above. The jet stack of FIG. 20 can be attached to a manifold according to the embodiments described above to form a print head.

It will be realized that a plasma etch to remove an epoxy material from a piezoelectric element as described above can be performed during the formation of other structures in addition to the specific embodiments discussed above. For example, a PZT piezoelectric structure can be encapsulated as protection against gasses or liquids from contacting the piezoelectric structure, to prevent damage from physical contact with a solid structure, to supply a damping to the piezoelectric structure, etc. The plated or unplated PZT piezoelectric structure can be exposed using a plasma etch as described above to provide a point of physical or electrical contact.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. 1, −2, −3, −10, −20, −30, etc.

While the present teachings have been illustrated with respect to one or more implementations, alterations and/or modifications can be made to the illustrated examples without departing from the spirit and scope of the appended claims. In addition, while a particular feature of the disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a wafer or substrate, regardless of the orientation of the wafer or substrate. The term "horizontal" or "lateral" as used in this application is defined as a plane parallel to the conventional plane or working surface of a wafer or substrate, regardless of the orientation of the wafer or substrate. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the wafer or substrate, regardless of the orientation of the wafer or substrate.

The invention claimed is:

1. A method for forming an ink jet print head, comprising:

attaching a diaphragm attach material to a diaphragm, wherein the diaphragm comprises a plurality of openings;

attaching a plurality of piezoelectric elements to the diaphragm;

dispensing a dielectric fill material to encapsulate the plurality of piezoelectric elements and to contact the diaphragm, wherein the diaphragm attach material prevents the flow of dielectric fill material through the plurality of openings in the diaphragm;

curing the dielectric fill material to form an interstitial layer between the plurality of piezoelectric elements and over an upper surface of the plurality of piezoelectric elements; and removing the interstitial layer from the upper surface of the plurality of piezoelectric elements using a plasma etch.

2. The method of claim 1, wherein the plasma etch comprises:

introducing an oxygen gas into an etch chamber at a delivery rate sufficient to provide an equilibrium chamber pressure of between about 100 mTorr and about 200 mTorr; and igniting a plasma at a radiofrequency power of between about 800 W and about 1,000 W.

3. The method of claim 1, further comprising:

attaching the diaphragm attach material covers the plurality of openings through the diaphragm; and subsequent to curing the dielectric fill material, removing the diaphragm attach material which covers the plurality of openings through the diaphragm.

4. The method of claim 3, wherein the diaphragm attach material which covers the plurality of openings through the diaphragm is removed by laser ablation.

5. The method of claim 4, further comprising removing a portion of the interstitial layer between piezoelectric elements during the removal of the diaphragm attach material which covers the plurality of openings through the diaphragm.

6. The method of claim 1, wherein the dispensing of the dielectric fill material dispenses a material comprising a thermoset polymer.

7. The method of claim 1, further comprising:

the diaphragm is part of a jet stack subassembly comprising an inlet/outlet plate and a body plate;

the diaphragm attach material attaches the diaphragm to the body plate;

attaching the diaphragm attach material to the diaphragm covers the plurality of opening through the diaphragm;

subsequent to curing the dielectric fill material, removing the diaphragm attach material which covers the plurality of openings through the diaphragm; and subsequent to removing the diaphragm attach material which covers the plurality of openings through the diaphragm, attaching an aperture plate comprising a plurality of nozzles to the body plate.

8. The method of claim 7, further comprising:

electrically coupling the plurality of piezoelectric elements to a plurality of printed circuit board electrodes.

9. The method of claim 1, further comprising:

attaching a piezoelectric element layer to a transfer carrier;

dicing the piezoelectric element layer to form the plurality of piezoelectric elements; and subsequent to attaching the plurality of piezoelectric elements to the diaphragm, removing the transfer carrier from the plurality of piezoelectric elements.

10. The method of claim 9, wherein the attachment of the piezoelectric element layer to the transfer carrier attaches a piezoelectric element layer comprising a nickel-plated lead-zirconate-titanate piezoelectric layer.

11. A method for forming an ink jet print head, comprising:

attaching a diaphragm attach material to a diaphragm, wherein the diaphragm comprises a plurality of openings therethrough;

attaching a plurality of piezoelectric elements to the diaphragm;

dispensing a dielectric fill material to encapsulate the plurality of piezoelectric elements and to contact the diaphragm, wherein the diaphragm attach material prevents the flow of dielectric fill material through the plurality of openings in the diaphragm;

curing the dielectric fill material to form an interstitial layer between the plurality of piezoelectric elements and over an upper surface of the plurality of piezoelectric elements;

placing a patterned adhesive layer and a patterned removable liner over the interstitial layer, wherein openings within the patterned adhesive layer and the patterned removable liner expose the interstitial layer at locations which overlie the piezoelectric elements; and removing the interstitial layer from the upper surface of the plurality of piezoelectric elements with a plasma etch using the patterned removable liner and the patterned adhesive layer as an etch mask.

12. The method of claim 11, wherein the plasma etch comprises:

introducing an oxygen gas into an etch chamber at a delivery rate sufficient to provide an equilibrium chamber pressure of between about 100 mTorr and about 200 mTorr; and igniting a plasma at a radiofrequency power of between about 800 W and about 1,000 W.

13. The method of claim 11, further comprising:

placing a conductor into the openings within the patterned adhesive layer and the patterned removable liner;

subsequent to placing the conductor into the openings, removing the removable liner; and electrically coupling the plurality of piezoelectric elements with a plurality of printed circuit board (PCB) electrodes using the conductor.

14. The method of claim 13, further comprising:

mechanically attaching the interstitial layer to a PCB using the patterned adhesive layer.

15. The method of claim 11, further comprising:

clearing the diaphragm attach material, the interstitial layer, and the patterned adhesive layer from the openings in the diaphragm using laser ablation.

16. The method of claim 11, further comprising:

attaching a piezoelectric element layer to a transfer carrier;

dicing the piezoelectric element layer to form the plurality of piezoelectric elements; and subsequent to attaching the plurality of piezoelectric elements to the diaphragm, removing the transfer carrier from the plurality of piezoelectric elements.

17. A method for forming an ink jet print head, comprising:

attaching a piezoelectric element layer to a transfer carrier;

dicing the piezoelectric element layer to form a plurality of piezoelectric elements;

attaching the plurality of piezoelectric elements to a diaphragm of a jet stack subassembly, wherein the jet stack subassembly further comprises an inlet/outlet plate, a body plate, a plurality of openings in the diaphragm, and a diaphragm attach material which covers the plurality of openings in the diaphragm;

dispensing a dielectric fill material to encapsulate the plurality of piezoelectric elements and to contact the diaphragm, wherein the diaphragm attach material prevents the flow of dielectric fill material through the plurality of openings in the diaphragm;

curing the dielectric fill material to form an interstitial layer between the plurality of piezoelectric elements and over an upper surface of the plurality of piezoelectric elements;

placing a patterned adhesive layer and a patterned removable liner over the interstitial layer, wherein openings within the patterned adhesive layer and the patterned removable liner expose the interstitial layer at locations which overlie the piezoelectric elements;

removing the interstitial layer from the upper surface of the plurality of piezoelectric elements with a plasma etch using the patterned removable liner and the patterned adhesive layer as an etch mask, wherein the plasma etch comprises introducing an oxygen gas into an etch chamber at a delivery rate sufficient to provide an equilibrium chamber pressure of between about 100 mTorr and about 200 mTorr and igniting a plasma at a radiofrequency power of between about 800 W and about 1,000 W;

placing a conductive paste within the openings in the patterned removable liner and the patterned adhesive layer;

removing the patterned removable liner;

using a laser beam, ablating the diaphragm attach material, the interstitial layer, and the patterned adhesive layer from the plurality of openings in the diaphragm, wherein the body plate and the inlet/outlet plate mask the laser beam;

mechanically attaching a printed circuit board (PCB) to the interstitial layer with the patterned adhesive layer, wherein the conductive paste electrically coupled PCB electrodes to the piezoelectric elements; and attaching a manifold to the PCB.

18. A method for forming an assembly, comprising:

encapsulating a piezoelectric structure within an epoxy; and plasma etching at least a portion of the epoxy to expose the piezoelectric structure.

19. The method of claim 18, wherein the plasma etch comprises:

introducing an oxygen gas into an etch chamber at a delivery rate sufficient to provide an equilibrium chamber pressure of between about 100 mTorr and about 200 mTorr; and igniting a plasma at a radiofrequency power of between about 800 W and about 1,000 W.

* * * * *